US008675823B2

(12) United States Patent
Hooten

(10) Patent No.: US 8,675,823 B2
(45) Date of Patent: Mar. 18, 2014

(54) METHOD AND APPARATUS FOR ACTIVATING A COMMUNICATION DEVICE OPERABLY CONNECTED TO A SAFETY LANYARD

(75) Inventor: W. Dale Hooten, Melrose, FL (US)

(73) Assignee: Hooten Investments, Inc., Melrose, FL (US)

(*) Notice: Subject to any disclaimer, the term of this patent is extended or adjusted under 35 U.S.C. 154(b) by 416 days.

(21) Appl. No.: 12/917,132

(22) Filed: Nov. 1, 2010

(65) Prior Publication Data

US 2011/0103558 A1 May 5, 2011

Related U.S. Application Data

(60) Provisional application No. 61/256,359, filed on Oct. 30, 2009.

(51) Int. Cl.
*H04M 11/04* (2006.01)

(52) U.S. Cl.
USPC .......... 379/37; 182/3

(58) Field of Classification Search
USPC .......... 379/37
See application file for complete search history.

(56) References Cited

U.S. PATENT DOCUMENTS

| | | | | |
|---|---|---|---|---|
| 4,003,048 | A * | 1/1977 | Weise | 340/568.4 |
| 5,348,067 | A | 9/1994 | Myatt | |
| 6,539,588 | B1 * | 4/2003 | Brosofsky et al. | 24/3.4 |
| 7,231,200 | B2 * | 6/2007 | Jenkins | 455/404.1 |
| 7,412,226 | B2 * | 8/2008 | Kayzar et al. | 455/404.2 |
| 2004/0031644 | A1 * | 2/2004 | Kurtgis | 182/3 |
| 2006/0010090 | A1 * | 1/2006 | Brockway et al. | 706/46 |
| 2006/0260892 | A1 * | 11/2006 | Renton | 188/371 |
| 2007/0049353 | A1 * | 3/2007 | Trozzi | 455/573 |
| 2007/0082661 | A1 * | 4/2007 | Black et al. | 455/418 |
| 2008/0060872 | A1 * | 3/2008 | Wise | 182/3 |
| 2009/0036757 | A1 * | 2/2009 | Brockway et al. | 600/301 |
| 2010/0219016 | A1 * | 9/2010 | Meillet | 182/8 |
| 2010/0231402 | A1 * | 9/2010 | Flynt et al. | 340/679 |
| 2011/0103558 | A1 * | 5/2011 | Hooten | 379/37 |

OTHER PUBLICATIONS

Parker Chomeric, *THERM CAT 1001 Rev D 5/08*, "THERMATTACH® Tape: Thermally Conductive Attachment Tapes," pp. 23-26.
Seal Science, Inc., "EMI/RFI/ESD Shielding," 2011, http://www.sealscience.com/Conductive_Rubber.aspx.

* cited by examiner

*Primary Examiner* — Maria El-Zoobi
(74) *Attorney, Agent, or Firm* — Saliwanchik, Lloyd & Eisenschenk

(57) ABSTRACT

A personal safety device comprises a "smart" safety lanyard capable of automatically contacting emergency response personnel. A "smart" lanyard of the subject invention comprises a strap with one or more fall arrest mechanisms or break away mechanisms operably attached thereto. A trigger mechanism also operably attached to the safety lanyard can detect when the fall arrest or break away mechanism has been deployed. A personal communication device operably attached to both the strap and to the trigger mechanism can automatically contact response personnel when the lanyard has been deployed.

25 Claims, 4 Drawing Sheets

METHOD AND APPARATUS FOR ACTIVATING A COMMUNICATION DEVICE OPERABLY CONNECTED TO A SAFETY LANYARD

CROSS-REFERENCE TO RELATED APPLICATION

The present application claims the benefit of U.S. Provisional Application Ser. No. 61/256,359, filed Oct. 30, 2009, which is hereby incorporated by reference herein in its entirety, including any figures, tables, or drawings.

BACKGROUND OF INVENTION

Personal safety equipment is required to be used in a many professions, particularly those where work is performed in hazardous locations, such as at significant height. As such, a variety of styles and types of harnesses and safety lanyards have been developed for use in particular situations. Many of them include secondary safety features such as break-away attachments, shock absorbing features, stretchable and/or elastic designs, as well as a multitude of attachment mechanisms. Professionals who rely on their personal safety equipment often ensure that it meets all OSHA, ANSI, and CSA requirements and habitually check the integrity of their equipment.

Usually such equipment is attached to a person's body or clothing and to another object or anchorage point. It is designed to deploy when a particular situation or certain circumstances arise. Some designs protect the person from falls or other impact and subsequent bodily injury therefrom, by deploying when sufficient stress is applied to the lanyard. Still others are designed to be worn around the neck, arm or leg to attach various devices to the body, e.g., MPS, cell phones, GPS devices, tools, shut-off keys, and/or emergency beacons, and can include breakaway features to prevent choking or other injury should the lanyard become entangled or caught. For example, machinists may have regularly used tools or equipment attached to themselves via a safety lanyard designed to break-away should it become entangled or caught in equipment.

When a safety lanyard is deployed, it is often the result of an emergency situation where the person or object has been unintentionally moved away from a particular location or position, such as by falling, toppling, being thrown, entangled or otherwise moved, more than a safe distance from where the person or object was attached. Once the person moves beyond the predetermined length of the safety lanyard, secondary safety features can be deployed to prevent or reduce bodily injury. Some safety lanyards include stretchable and/or elastic material that can expand beyond the nominal length when sufficient stress is applied. Others include single- or multi-stage shock absorbing stitching that breaks with the application of sufficient stress or load to allow the lanyard to lengthen in stages and thereby reduce the overall G-forces on the body during a fall. Those used for holding devices, particularly around the neck, often include break-away features that allow them to be automatically disconnected from the body, such as by the lanyard breaking apart at a pre-determined point(s).

When a lanyard is deployed, it is often the case that the person or object attached to it has been placed in a dire situation. If the person or object has fallen or been thrown, the lanyard can deploy to prevent deadly force, but the person may still be injured or unable to climb back to a safe location. The disadvantage of current safety lanyard designs is that they do not provide any assistance to the person after deployment. Safety lanyards that break away from the body can prevent or reduce injury, but any devices that were attached, such as a cell phone, a GPS device, or an emergency beacon, could subsequently be too far away to be useful. Other safety lanyards that prevent or reduce impact from falling, may still remain attached, but the person could be injured or in a situation where he is unable to help himself.

Accordingly, there is a need for improved personal safety equipment that incorporates emergency contact features. More specifically, there is a need for a "smart" safety lanyard that can, if deployed, transmit a signal, alarm, or otherwise initiate contact with appropriate response personnel.

BRIEF SUMMARY

Embodiments of the present invention pertain to personal safety equipment. Specific embodiments relate to safety lanyards. In a specific embodiment, a safety lanyard can include a trigger mechanism capable of reacting to the lanyard being deployed, being triggered during the deployment of the lanyard, and/or detecting when the lanyard has been deployed. In specific embodiments, when the lanyard is deployed the trigger mechanism automatically activates a device that can initiate contact or provide location information to appropriate response personnel.

Embodiments of the subject safety lanyard incorporate a "smart" mechanism that can be triggered when the lanyard is deployed. When triggered, the "smart" mechanism activates a device that can alert and/or contact other people in the area, emergency personnel, doctors, and/or other appropriate individuals to the fact that the lanyard has been deployed and that the person may be in need of assistance. Such a "smart" safety lanyard can ensure that when a person is in need of assistance, even if the person is rendered unconscious, a signal or call for aid can still be made. Embodiments can include speakers and/or microphones for one-way or two-way communication with the individual in need, or with other people in the vicinity. Specific embodiments can include Global Positioning System (UPS) devices, Emergency Position-Indicating Radio Beacon (EPIRB), or other emergency beacon to transmit the person's location to appropriate personnel. Still other embodiments can include one or more of the following: a mechanism to manually deploy the activation mechanism; a mechanism to temporarily disable the activation mechanism; and a false-alarm signal in case of an unintentional deployment. A specific embodiment can provide a pre-determined time delay after the triggering of the mechanism that detects that the lanyard is being and/or has been deployed, before activating the alert mechanism, where activation of the alert mechanism can be avoided if an abort mechanism is engaged. In this way, false alarms can be reduced or avoided.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. It should also be understood that the drawings presented herein may not be drawn to scale and that any reference to dimensions in the drawings or the following description are specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIG. 2A shows a safety lanyard with an elastic strap; FIG. 2B shows a safety lanyard that utilizes a "shock pack" that gradually releases coiled sections of lanyard; and FIG. 2C shows a safety lanyard that utilizes an elastic strap in conjunction with breakaway stitching.

DETAILED DISCLOSURE

Figure 1A:
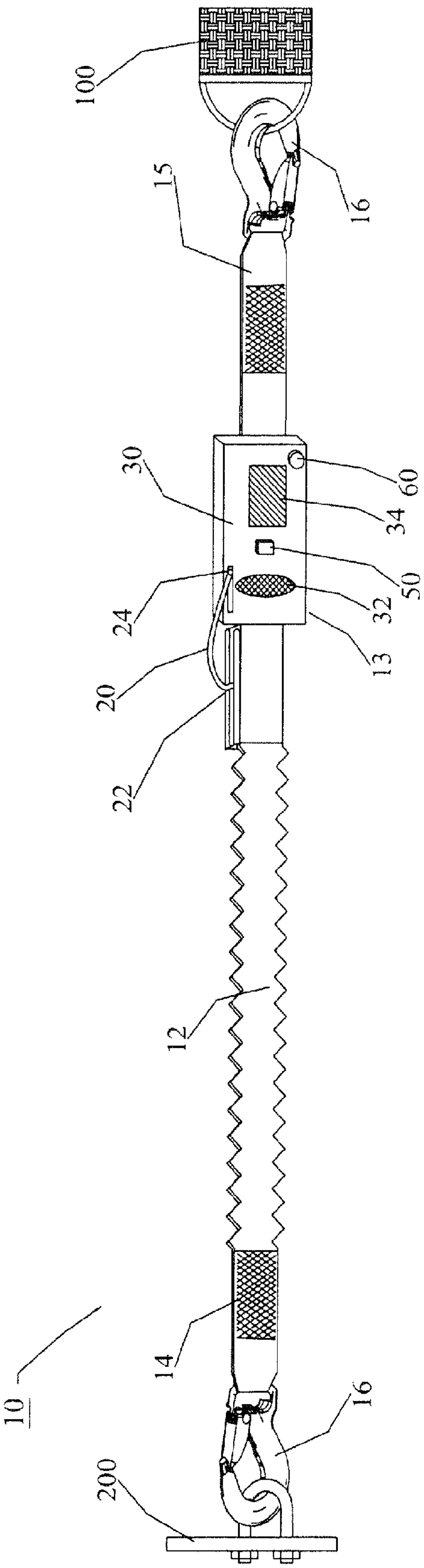
FIG. 1A is an illustration of one embodiment of a safety lanyard in accordance with the subject invention, which utilizes a fall arrest mechanism and gated safety hooks on either end for attachment.

Embodiments of the subject invention relate to a personal safety device. Specific embodiments pertain to "smart" safety lanyards, or similar devices, capable of sending an alert or otherwise contacting appropriate personnel when the lanyard, and/or various safety features thereon, are deployed.

The following description will disclose that the subject invention is particularly useful in professions where individuals are at risk of falling, such as the construction of cell phone or power line towers, building or roofing construction, and tree trimming or removal. A safety lanyard in accordance with the subject invention can also be used in many other situations where an indication of motion or movement of a person or object from one location to another is desired. However, a person with skill in the art will be able to recognize numerous other uses that would be applicable to the devices and methods of the subject invention. While the subject application will describe a specific use in situations were falling from a significant height is a concern, other uses and modifications therefore will be apparent to a person with skill in the art and having benefit of the subject disclosure are contemplated to be within the scope of the present invention.

As used herein, and unless otherwise specifically stated, the terms "operable communication", "operable attachment", "operably connected" and the like, mean that the particular elements communicate, are attached, or are connected, respectively, in such a way that they cooperate to achieve their intended function or functions. The "connection" may be direct, or indirect, physical, or remote.

Also, the terms "emergency response personnel", "emergency personnel", and "appropriate response personnel" and the like, are used interchangeably herein and refer to any person(s) capable of providing assistance to someone wearing a "smart" safety lanyard of the subject invention. Such person(s) capable of assisting an individual in need can include, among others, co-workers or companions in the vicinity, emergency medical technicians (EMTs), firemen, policemen, doctors, nurses, caregivers, or other people trained to handle the particular emergency situation.

In addition, references to "first", "second", and the like (e.g., first and second terminal ends), as used herein, and unless otherwise specifically stated, are intended to identify a particular feature of which there are at least two. However, these references are not intended to confer any order in time, structural orientation, or sidedness (e.g., left or right) with respect to a particular feature.

The present invention is more particularly described in the following examples that are intended to be illustrative only, since numerous modifications and variations therein will be apparent to those skilled in the art. As used in the specification and in the claims, the singular for "a," "an" and "the" include plural referents unless the context clearly dictates otherwise.

Referring to FIGS. 1-3, certain embodiments of a safety lanyard 10 are shown. Referring to FIGS. 1 and 2, it can be seen that embodiments of the subject invention include a strap 12 having a first end 14 and a second end 15. Each end of the strap can terminate in one or more connection mechanisms 16 for attachment to either a person 100 or anchorage point 200. Advantageously, the safety lanyard can include "smart" technology utilizing a trigger mechanism 20 operably attached and/or operably connected to the strap 12 that can be activated when the lanyard is deployed. In a specific embodiment, the trigger mechanism 20 can be activated when the ends of the trigger mechanism are extended apart, for example when the strap, or a portion of the strap, exceeds a pre-determined length. Activation of the trigger mechanism 20 can cause a personal communication device 30 to automatically contact emergency response personnel. FIG. 1 illustrates a general, but non-limiting, embodiment of a "smart" safety lanyard in accordance with the subject invention.

Figure 2A:
FIGS. 2A, 2B, and 2C are photographs of typical safety lanyards that can be incorporated with the embodiments of the subject invention, where
Figure 2B:
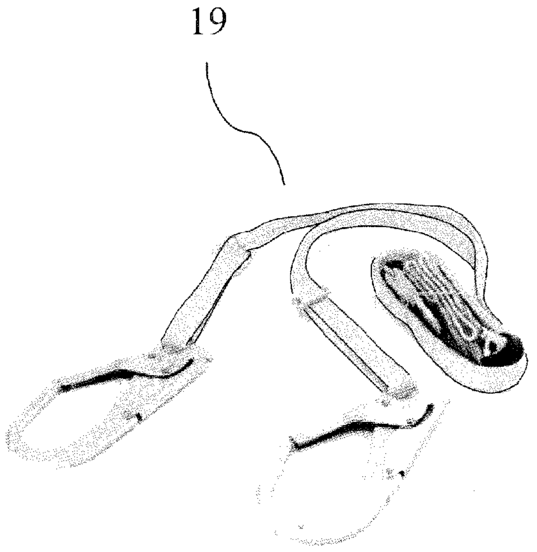
Figure 2C:
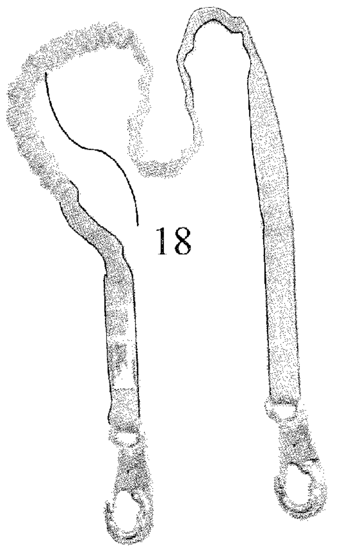

Safety lanyards 12 are well-known in the art and a wide variety of styles and types are used for different professions and purposes. Various embodiments of the invention can incorporate all or portions of these well-known safety lanyards. For example, shock absorbing lanyards are well-known and commonly used in situations where falling is a concern, and can be utilized with embodiments of the subject invention. Shock-absorbing lanyards often include straps 12 having one or more "fall arrest" features 13 that can extend the deceleration distance during a fall, significantly reducing fall arresting forces, for example by 65% to 80%, which is considered to be below the threshold of injury. FIGS. 2A, 2B, and 2C illustrate examples of standard, known shock-absorbing safety lanyards known to those with skill in the art.

There are several types of fall arrest mechanisms 13 that can be utilized with embodiments of the subject invention, either alone or in combination, including, but not limited to, stretchable and/or elastic materials 17 (a.k.a., "bungee cord"), break-away stitching 18, expandable or lengthening folds 19 (a.k.a., shock-packs), retractable coils or spring, or other stress-activated, strap-extending or strap-altering methods. Fall arrest mechanisms operate by gradually slowing descent during a fall while, importantly, still maintaining secure attachment between the person and the object to which they are attached. Stress applied to the strap, usually from a fall, will cause the fall arrest mechanism to be deployed, i.e., allow the strap to extend beyond the pre-set length. Thus, at some point, the strap will reach a maximum length at which all descent has stopped.

Alternative embodiments utilize safety lanyards with one or more break-away mechanisms 40. These allow a person or object to be automatically disconnected from the anchorage or some other object to which they are attached, if sufficient force or pressure is applied to the break-away mechanism. Any of a variety of breakaway-mechanisms, techniques and devices are known to those with skill in the art, including, by way of example, buckles, clasps, connectors, pressed attachments, perforated or scored materials, key switches, and the like can all be utilized with a safety lanyard of the subject invention.

A person with skill in the art would be able to devise any of a variety of techniques or may have knowledge of numerous materials or devices that would be suitable for use either with, or as, a strap in accordance with the subject invention. Thus, fall arrest and break away mechanisms are known in the art. Any and all such variations are considered to be within the scope of the subject invention.

Figure 1B:
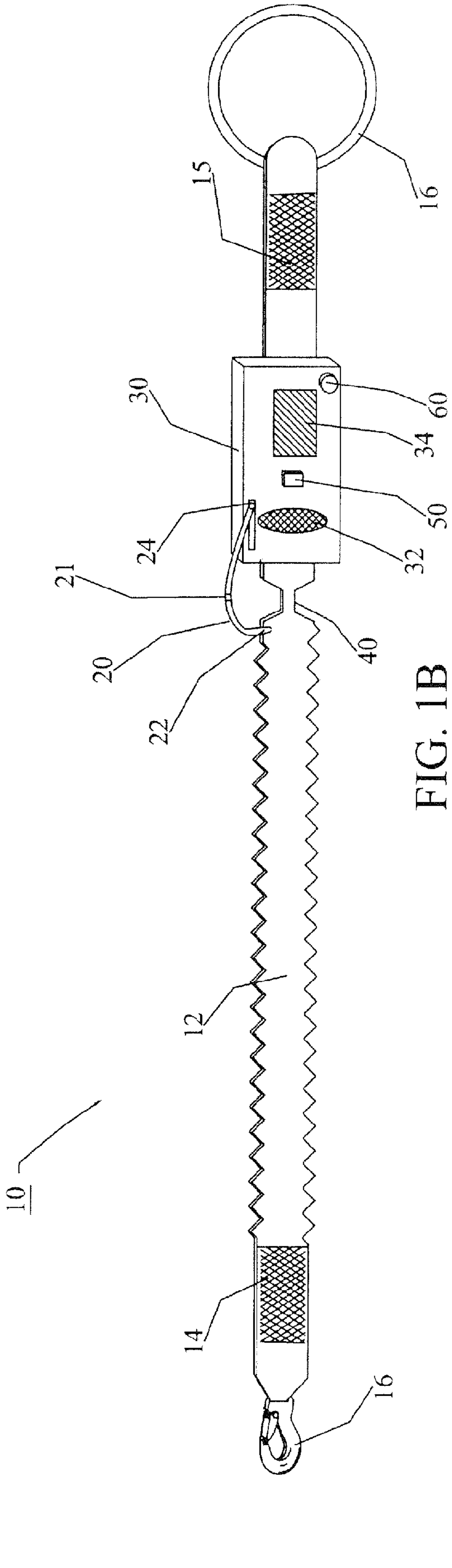
FIG. 1B is an illustration of an alternative embodiment of a safety lanyard in accordance with the subject invention, which utilizes a break-away mechanism and a loop for attachment to a person.

In order to operably connect a strap 12 to a person and/or any other object, such as, for example, safe anchorage, the first end 14 and the second end 15 can include any of a variety of attachment mechanisms 16 known to those with skill in the art. In one embodiment, the means for attachment is an easily attachable/removable device such as, for example, hooks—gated or otherwise, D-rings, clamps, screw locks, non-metal loops, any of a variety of buckles, or other suitable and safe devices. In an alternative embodiment, the means for attachment is a more permanent device, such as nut and bolt, welding, specialized anchorage attachment clamps, and other devices known to those with skill in the art. The attachments means can be the same or different at each end 14 and 15 of the strap 12. In a particular embodiment, the attachment means between the strap 12 and the person is removable. In a specific embodiment, the attachment at the first end 14 and the second end 15 comprises one or more snap hooks with gate openings, as shown for example in FIG. 2. FIG. 1B shows an alternative embodiment with a break-away mechanism 40 having different attachment means at each end, those being an adjustable loop for attachment to a person and a gated safety hook for attachment to an object. However, it should be understood that the means for operable attachment of the strap to a person, object, and/or anchorage can vary depending upon several factors including, but not limited to, the environment in which the device is used, the size of the person, type of anchorage or other object attached, and other factors of which a person with skill in the art would be knowledgeable. Therefore, it should be understood that person with skill in the art having benefit of the subject disclosure would be able to determine any of a variety of attachment means that would be suitable for use with the subject invention. It is contemplated that any and all such attachment means fall within the scope of the subject invention.

In a specific embodiment, the safety lanyard 10 can detect and react when a threshold magnitude of force is applied. In a more specific embodiment, the safety lanyard 10 can detect when one or more of the fall arrest 13 and/or break-away 40 mechanisms have been deployed, or otherwise detect when the lanyard 10 has been deployed. Once deployment has been detected, a personal communication device 30 can be activated to alert emergency personnel. To facilitate deployment detection and subsequent activation of the personal communication device, a trigger mechanism 20 can be attached to the safety lanyard. The trigger mechanism 20 can detect or react to specific changes to the strap and/or the attachment mechanism(s) 16 that are indicative of the fall arrest or break-away mechanism(s) being deployed.

In one embodiment, the trigger mechanism 20 is an effector capable of detecting when the safety lanyard's 10 strap 12 has reached or exceeded a pre-determined length. The trigger mechanism can comprise one or more of an elastic, non-elastic, or semi-elastic material(s). In a further embodiment, the trigger mechanism has one or more first terminal ends 22 operably attached to the strap 12 and one or more second terminal ends 24 operably attached to the personal communication device 30. In an alternative embodiment, the one or more first terminal ends 22 are operably attached to one or more points, areas or sections on the strap 12 and the one or more second terminal ends 24 are operably attached to one or more different points, areas, or sections on the strap 12. In a yet another alternative embodiment, the one or more first terminal ends 22 are operably attached to one or more points, areas or sections on the strap 12 and the one or more second terminal ends 24 are operably attached to one or more different points, areas, or sections on the fall arrest or break-away mechanism(s). Additional terminal end attachments can be utilized to facilitate operable connection between the trigger mechanism and the personal communication device. The trigger mechanism can further have a pre-determined extension length based upon, for example, the type and deceleration length of the fall arrest mechanism 13, as well as the location of the attachment points. When the fall arrest mechanism 13 is in an un-deployed condition, the trigger mechanism can also be maintained in a non-activation state, which is to say that the trigger mechanism cannot activate the personal communication device, when un-deployed.

In one embodiment, when the fall arrest mechanism 13 is activated by application of a threshold maximum force to the lanyard and the strap 13 extends beyond the pre-determined safe length or reaches a pre-determined maximum length, the first terminal end and the second terminal end of the trigger mechanism are pulled apart because of their separate attachment points. When the first terminal end and the second terminal end reach a pre-determined maximum distance apart, the trigger mechanism can activate the personal communication device 30 to contact or otherwise establish some type of communications with the appropriate response personnel.

The activation of the personal communication device 30 can be initiated by a diverse number of techniques. In one embodiment, the trigger mechanism 20 employs a weak zone 21 designed to break, rip, snap, pull apart, or otherwise separate when stress is applied to the lanyard, such as, for example, a threshold load or force that extends the lanyard to, or beyond, the pre-determined length. The weak zone can be anywhere on the trigger mechanism. Alternatively, the weak zone can be at or near one or more of the operable connections of the trigger terminal ends to the strap and/or communication device, such that the trigger can be separated from the strap and/or communication device at terminal end(s). Once the trigger mechanism has been separated, an electrical circuit, mechanical connection, wireless connection, or other apparatus can be rendered operable and, thus, capable of activating the personal communication device 30. This type of trigger mechanism can be particularly useful with, but is not limited to, safety lanyards that also utilize break-away mechanisms 40. In one embodiment, the trigger mechanism separates at or about the same time that the break-away mechanism separates.

In an alternative embodiment, when the first terminal end 14 and the second terminal end 15 of the trigger mechanism are extended to a pre-determined length, any of a variety of actuators operably connected to the personal communication device 30 is able to make an operable connection, such as by electrical circuit, mechanical connection, wireless connection, or other device or procedure, that activates the personal communication device 30. In this embodiment, the trigger mechanism is not separated or broken, as described above. In a particular embodiment, the trigger mechanism, when activated, completes a circuit that allows the personal communication device to operate. In a particular embodiment, one or more magnets are utilized to activate the communication device. In this embodiment, the one or more magnets are forced apart and/or forced together to complete a circuit that allows the communication device to operate.

In another alternative embodiment, a material capable of holding, conducting, and separating electric charge can be utilized as a trigger mechanism or part of a trigger mechanism. In a specific embodiment, an electrically conductive material is utilized as a trigger mechanism. The material, e.g., dielectric insulator, conductive rubber, metal sheets, or other electrically conductive device, can have an electrical resistance, impedance, reactance, capacitance, inductance, or other electrical property, that is distinctive for each object, or portion of the material or lanyard, due to, for example, minute differences between the shape or structure of each object. Changes to the overall shape or structure of the material can affect the electrical resistance, reactance, capacitance, inductance, or other electrical property thereof.

Figure 3A:
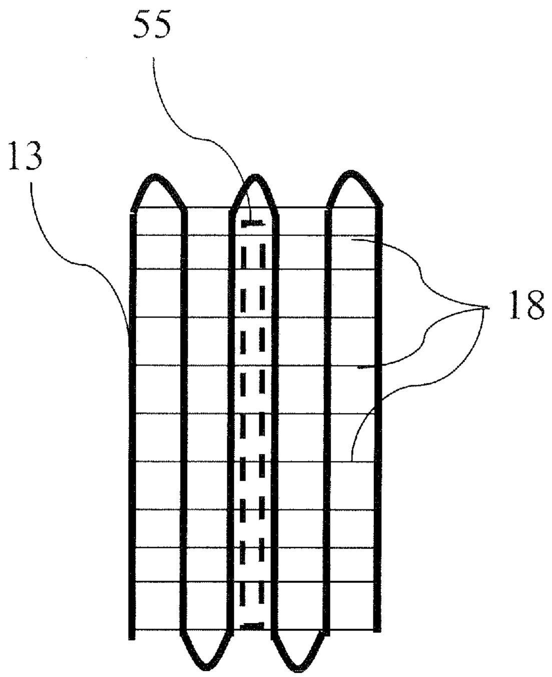
FIG. 3 is an illustration of an embodiment of the subject invention where the trigger mechanism is an electrically conducting material having an impedance, or other electrical property, calibrated with respect to a portion of the material, in order to detect when the lanyard is deployed and, therefore, alters the impedance or other electrical property with respect to the portion of the material.
Figure 3B:
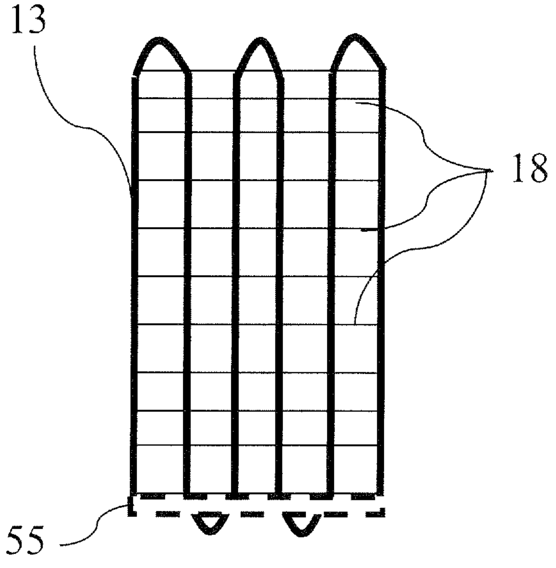

In one embodiment of the subject invention, an electrically conductive material is utilized as a trigger 55. In one embodiment, the electrically conductive trigger 55 is configured to work with the folds of a "break-away" or shock-pack device of a fall arrest lanyard. In a particular embodiment, the electrically conductive trigger is embedded, or otherwise located, within the folds of a "break-away" or shock pack fall arrest lanyard. FIGS. 3A and 3B illustrate non-limiting examples of this embodiment. In a particular embodiment, the electrically conductive trigger 55 is a sheet of metallic material, such as aluminum. Alternatively, the trigger is an electrically conductive elastomer, such as, but not limited to, conductive rubber or silicone. The electrically conductive trigger can be sewn between the folds of the shock-pack, as shown in FIG. 3A. Alternatively, it can be attached so as to surround the folds, as shown in FIG. 3B.

In a further embodiment, the communication device is calibrated to function with the electrically conductive trigger, wherein the communication device remains inoperative when the electrical impulse from the electrically conductive trigger remains within a pre-determined threshold range. More specifically, the communication device 30 is calibrated to the emitted Ohm reading of the conductive trigger. As long as the conductive trigger emits a stable Ohm reading, the communication device can remain inactive. However, when the folds of the shock-pack mechanism are deployed, the Ohm reading of the conductive trigger can be configured to change output. This change in output can be detected by the communication device, which is then prompted to activate. Again, in other embodiments changes in other electrical properties of a portion of the lanyard, such as impedance, reactance, capacitance, and inductance, can result in triggering the communication device.

It should be understood that a person with skill in the art would be able to determine any of a variety of one or more techniques or devices that could be utilized to activate a communication device. It is contemplated that such alternatives are within the scope of the embodiments of the subject invention.

The embodiments described above utilize a trigger mechanism that can be activated by changes in the length of the strap. However, there are numerous other indicators that can be utilized with a trigger mechanism of the subject invention. By way of non-limiting examples, the trigger can be activated by a change in the diameter or width of the strap, such as can occur when an elastic band stretches; friction or heat detectors could be used to detect temperature changes in the strap that can occur when the break-away stitching is forced apart or when the strap material rubs together as it exits a "shock pack"; optical sensors could be used to detect a change(s) in the color of the strap or the distance between two points on the strap; audio sensors could be used to detect a specific sound that occurs when the fall arrest mechanism(s) is deployed.

With regard to the personal communication device 30, there are a myriad of devices that can be utilized separately or simultaneously with embodiments of the subject invention. Such devices can utilize a direct or indirect communication with the trigger device and can include, but are not limited to, electrical circuits, mechanical connections, wireless connections, various audio or visual signals, etc. Further, the communication device can be operably attached, so as to be part of the safety lanyard 10. But, alternatively, the communication device can be remotely located and separate from the safety lanyard, such that it is not operably attached to the lanyard. In this embodiment, the trigger mechanism would be able to transmit a signal capable of activating the communication device from a distance.

In one embodiment, the personal communication device is capable of transmitting an automatic emergency signal to appropriate response personnel. Emergency signals are well-known in the art and there are several standard hailing signals utilized under various circumstances and environments. By way of non-limiting example, an Emergency Position-Indicating Radio Beacon (EPIRB) can be utilized to transmit a distress signal and location coordinates to appropriate response personnel. By way of further non-limiting example, an emergency beacon can be utilized to transmit a distress signal and/or provide a visual indicator, such as a flashing light, or audio indicator, such as an alarm, to direct attention to the person's location. Other embodiments can utilize various commercially available and privately supported Global Positioning System (GPS) devices (e.g., SPOT™, PULSE™, etc.). These systems often utilize a commercial satellite system, such as, for example the On-Star™ or the GEOS Alliance System that communicates with an emergency response center to coordinate search and rescue efforts. A still further embodiment utilizes a cellular phone pre-configured to respond and/or activate when an appropriate signal is received. A person with skill in the art would be able to determine and establish appropriate signal protocol that could be used with the embodiments of the subject invention. It is considered that any and all such variations are within the scope of the subject invention.

In many situations it can be helpful if communications can be established and maintained between emergency personnel and the person in need of assistance, or, perhaps, other people in the vicinity of such person. Thus, in a further embodiment, the personal communication device includes one or more of a speaker 32 and/or microphone 34 or similar devices to facilitate audio-based two-way communication. For example, a cellular phone, two-way radio, citizen-band (CB) radio, very-high-frequency (VHF) radio, FM or AM frequency radio, or similar two-way communication devices could be incorporated as, or with, the personal communication device 30. In one embodiment, the two-way communication can be established and maintained without assistance from the person in need or other persons in the vicinity. In another embodiment, two-way communication can be established and maintained when the communication device is activated by the person in need or other persons in the vicinity.

While it is expected that deployment of a safety lanyard and any fall arrest mechanism(s) 13 or break away mechanism(s) 40, as a part thereof, would usually constitute an emergency, it is not always necessary for emergency response personnel to provide assistance. For example, if a person that has fallen is still conscious, unhurt, and able to return on their own to a safe location, there would be no need for assistance.

In other situations, the person who has fallen may have co-workers or other people in the vicinity capable of providing assistance. If the safety lanyard is utilized for some purpose other than protecting a person, such as securing equipment or other objects, then deployment of the safety lanyard may not constitute an emergency requiring other trained personnel. It is also possible for a safety lanyard to be deployed accidentally, initiating a false alarm.

There may also be situations where an individual may require assistance or needs to communicate with response personnel, but not necessarily because the safety lanyard has been deployed. In such situations, it may be desirable to utilize the personal communication device 30 without having to deploy the safety lanyard in order to activate the personal communication device. In one embodiment, the personal communication device includes a manual on/off switch 50, so that it can be disarmed or turned off to prevent activation or turned on without deploying the safety lanyard. This can also be helpful if the lanyard is being stored or used for a purpose other than protecting a person. In a further embodiment, the personal communication device incorporates a secondary signal or a false alarm signal 60 that can be activated to inform emergency response personnel that there has been a false alarm signal and that they do not need to respond to an emergency at that location.

Following are specific embodiments of the invention described herein:

An embodiment wherein a safety apparatus incorporates:

a lanyard having a first end and a second end, wherein each end terminates in a means for load bearing attachment;

a signal device operably attached to the lanyard;

a triggering mechanism operably attached to the lanyard and operably attached to the signal device, wherein when the lanyard is deployed the triggering mechanism causes the signal device to produce a signal.

Specific embodiments have weatherproofing materials and packaging such that the safety device can be used in all kinds of weather without impacting the operation of the safety device, including, but not limited to, a weather resistant case, wrap, or heat shrink. Further embodiments can incorporate solar power charging capabilities such as those know in the art, such that the safety device is exposed to sufficient sunlight, the safety device remains charged and ready to function properly.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

It should be understood that any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is submitted that it is within the purview of one skilled in the art to affect such feature, structure, or characteristic in connection with other ones of the embodiments.

The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself. Further, it should be understood that, although the present invention has been described with reference to specific details of certain embodiments thereof, it is not intended that such details should be regarded as limitations upon the scope of the invention except as and to the extent that they are included in the accompanying claims.

I claim:

1. A safety lanyard apparatus, comprising:

a strap having a first end and a second end, wherein the first end terminates in a first connection mechanism configured to attach the first end to an anchorage point, wherein the second end terminates in a second connection mechanism configured to attach the second end to an attachment point that is operably connected to a person;

a communication device;

a trigger mechanism, wherein the trigger mechanism is attached to the strap, wherein the trigger mechanism is configured to detect when a threshold magnitude force is applied tending to separate the first end from the second end and, upon detection of the application of the threshold magnitude force tending to separate the first end from the second end, activate the communication device such that the communication device establishes a two-way communication between the person and response personnel.

2. The safety lanyard apparatus according to claim 1, wherein the strap further comprises a fall arrest mechanism, such that application of the threshold magnitude force tending to separate the first end from the second end activates the fall arrest mechanism causing a change in a length of the strap from the first end to the second end, whereby the first and second ends are further separated.

3. The safety lanyard apparatus according to claim 2, wherein the fall arrest mechanism is one or more of a stretchable material, elastic material, retractable coils, break-away stitching, or expandable folds.

4. The safety lanyard apparatus according to claim 2, wherein the fall arrest mechanism is a shock-pack.

5. The safety lanyard apparatus according to claim 1, wherein the communication device is selected from the group consisting of: a cellular phone device, a two-way radio device, a citizen-band radio device, and a very-high-frequency radio device.

6. The safety lanyard apparatus according to claim 1, wherein the trigger mechanism can react to one or more of the following changes to the strap: length, diameter, shape, color, temperature, frictional force experienced, sound, and the distance between two pre-determined positions on the strap.

7. The safety lanyard apparatus according to claim 1, wherein the trigger mechanism comprises an electrically conductive material, wherein the communication device is activated by a change in the structure of the electrically conductive material.

8. The safety lanyard apparatus according to claim 1, further comprising a manual on/off switch for controlling the communication device.

9. The safety lanyard apparatus according to claim 1, wherein activation of the communication device is delayed for a pre-determined amount of time after application of the threshold magnitude force to separate the first end from the second end.

10. The safety lanyard apparatus according to claim 1, wherein the communication device is affixed to the strap.

11. The safety lanyard apparatus according to claim 1, wherein the communication device is located remotely from the strap.

12. The safety lanyard apparatus according to claim 1, wherein the trigger mechanism comprises a break-away mechanism, wherein the break-away mechanism comprises a weak zone on the trigger mechanism.

13. A method for establishing a two-way communication between a person and response personnel, comprising:

attaching a safety lanyard apparatus between an attachment point that is operably connected to a person and an anchorage point, wherein the safety lanyard apparatus comprises, a strap having a first end and a second end, wherein the first end terminates in a first connection mechanism configured to attach the first end to the anchorage point, wherein the second end terminates in a second connection mechanism configured to attach the second end to the attachment point;

a communication device; and a trigger mechanism, wherein the trigger mechanism is attached to the strap, wherein the trigger mechanism is configured to detect when a threshold magnitude force is applied tending to separate the first end from the second end;

wherein attaching the safety lanyard apparatus between the attachment point and the anchorage point comprises:

attaching the first end to the anchorage point via the first connection mechanism; and attaching the second end to the attachment point via the second connection mechanism, wherein the trigger mechanism is configured such that, upon the trigger mechanism detecting when the threshold magnitude force is applied tending to separate the first end from the second end the trigger mechanism activates the communication device such that the communication device establishes a two-way communication between the person and response personnel.

14. The method according to claim 13, wherein wherein the safety lanyard apparatus prevents the person from falling more than a certain distance below the anchorage point.

15. The method according to claim 13, wherein the trigger mechanism is configured to detect when the threshold magnitude force is applied tending to separate the first end from the second end by detecting when a force equal to or greater than the threshold magnitude force is applied tending to separate the first end from the second end.

16. The method according to claim 13, wherein the trigger mechanism is configured to detect when a force equal to or greater than a threshold magnitude force is applied tending to separate the first end from the second end and, upon detection of the application of the force equal to or greater than the threshold magnitude force tending to separate the first end from the second end, activate the communication device such that the communication device establishes the two-way communication between the person and response personnel.

17. The safety lanyard apparatus according to claim 1, wherein the trigger mechanism is configured to detect when the threshold magnitude force is applied tending to separate the first end from the second end when the strap exceeds a pre-determined length.

18. The method according to claim 13, wherein the strap further comprises a fall arrest mechanism, such that application of the threshold magnitude force tending to separate the first end from the second end activates the fall arrest mechanism causing a change in a length of the strap from the first end to the second end, whereby the first and second ends are further separated.

19. The method according to claim 13, wherein the safety lanyard apparatus further comprises a manual on/off switch for controlling the communication device.

20. The method according to claim 13, wherein activation of the communication device is delayed for a pre-determined amount of time after application of the threshold magnitude force to separate the first end from the second end.

21. The method according to claim 13, wherein the communication device is affixed to the strap.

22. The method according to claim 13, wherein the communication device is located remotely from the strap.

23. The method according to claim 13, wherein the trigger mechanism comprises a break-away mechanism.

24. The method according to claim 13, wherein the communication device comprises a cellular phone device.

25. The safety lanyard apparatus according to claim 1, wherein the communication device comprises a cellular phone device.

* * * * *

UNITED STATES PATENT AND TRADEMARK OFFICE

CERTIFICATE OF CORRECTION

PATENT NO. : 8,675,823 B2
APPLICATION NO. : 12/917132
DATED : March 18, 2014
INVENTOR(S) : W. Dale Hooten It is certified that error appears in the above-identified patent and that said Letters Patent is hereby corrected as shown below:

In the Specification:

Column 2,
Line 39, "(UPS) devices," should read --(GPS) devices,--.

In the Claims:

Column 12,
Lines 1-2, "wherein wherein the" should read --wherein the--.

Signed and Sealed this
Twelfth Day of August, 2014

Michelle K. Lee
*Deputy Director of the United States Patent and Trademark Office*